United States Patent [19]
Thornton et al.

[11] Patent Number: 5,135,398
[45] Date of Patent: Aug. 4, 1992

[54] ELECTRONIC TEACHING DEVICE

[75] Inventors: Glen A. Thornton, Garland; Robert C. Greenberg; Brian C. McCormack, both of Dallas; Veronica B. Howard, Grapevine, all of Tex.; Gary G. Bitter, Scottsdale, Ariz.

[73] Assignee: Texas Instruments Incorporated, Dallas, Tex.

[21] Appl. No.: 560,626

[22] Filed: Jul. 31, 1990

[51] Int. Cl.⁵ .................. G09B 19/02; G09B 5/06
[52] U.S. Cl. ..................... 434/201; 273/434; 340/756; 434/323
[58] Field of Search ............. 434/201, 169, 202, 323, 434/307, 308; 273/430, 431, 434; 340/756, 765, 760

[56] References Cited

U.S. PATENT DOCUMENTS

| | | | |
|---|---|---|---|
| 4,321,046 | 3/1982 | Oda et al. | 434/201 |
| 4,340,374 | 7/1982 | Culley | 434/201 |
| 4,340,375 | 7/1982 | Sakave | 434/201 |
| 4,946,391 | 8/1990 | Hawkins et al. | 434/322 |
| 4,959,017 | 9/1990 | Thompson et al. | 434/201 |

FOREIGN PATENT DOCUMENTS 8606195 10/1986 World Int. Prop. O. .......... 340/756

Primary Examiner—Richard J. Apley
Assistant Examiner—J. Leubecker
Attorney, Agent, or Firm—William E. Hiller; Richard L. Donaldson

[57] ABSTRACT

An electronic teaching device (10) provides several mathematical activities including Place Value, Trade, Target, Solve It, Word Problems, Estimate, Select and Calculator. The Place Value activity enhances the understanding of numbers by pictorially displaying the place values. The Trade activity enhances the understanding of addition and subtraction by allowing the user to trade between the ones' place value and the tens' place value to properly perform a mathematical operation. The Target activity emphasizes logical reasoning and problem solving. The Solve It activity uses the place-value system to develop logical reasoning.

The Word Problems activity tests the user's knowledge of basic mathematical terms and facts. The Estimate activity develops the ability to estimate answers to problems. The Select activity allows the user to recognize basic math operations.

12 Claims, 8 Drawing Sheets

ELECTRONIC TEACHING DEVICE

RELATED APPLICATIONS

This application is related to U.S. patent application Ser. No. 560,907, filed Jul. 31, 1990 by McCormack et al., entitled "Electronic Teaching Device," and U.S. patent application Ser. No. 560,656, filed Jul. 31, 1990, by Howard et al., entitled "Electronic Teaching Device", filed concurrently herewith.

TECHNICAL FIELD OF THE DISCLOSURE

This invention relates in general to educational products, and more particularly to an electronic device for teaching mathematics.

BACKGROUND OF THE DISCLOSURE

The advent of consumer electronics has resulted in a number of electronic teaching devices. One field to which the electronic teaching devices have been applied is the study of mathematics. These devices have focused on presenting mathematics through numerical representations, i.e., the digits "0" through "9." The position of these digits in a character string represents the base ten numbering system.

By teaching mathematics through numerical representation, the play patterns are limited to drill and practice activities for children already familiar with the basic concepts of the base ten numbering system. Thus, these electronic teaching devices do not help children understand base ten system, but rather, merely improve their math skills through repetition.

Some devices represent numbers by counting objects. While this method can be practiced by children without knowledge of the base ten numbering system, it does not improve the child's understanding of the base ten numbering system because it does not teach the integral concept of place value.

Therefore, a need has arisen in the industry for an electronic teaching device which graphically presents mathematics associated with the base ten, or other base, numbering system.

SUMMARY OF THE DISCLOSURE

In accordance with the present invention, an electronic learning device is provided which substantially eliminates disadvantages associated with prior art devices.

In the present invention, an electronic teaching device is operable to display a plurality of numbers and an operator. The user is requested to arrange the numbers in an equation using the operator to achieve a desired result. The electronic device determines whether the user has properly arranged the numbers for the desired result.

The electronic device, for example, may request that the user arrange the numbers in an equation with the operator to achieve the lowest or highest positive result.

This aspect of the invention developes the logical reasoning of the user.

In another aspect of the present invention, the electronic device is operable to display a plurality of generated numbers to a user along with a target value. The electronic device alternately receives input from the user and from a second user (which may be the electronic device), each input being one of the generated numbers. A running total of the input numbers is maintained within the electronic device and a winner is determined after the running total equals or exceeds the target value. This aspect of the invention emphasizes logical reasoning and problem solving.

This aspect of the invention provides a greater understanding of the interaction between the number system and the mathematical operations.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE DISCLOSURE

The preferred embodiment of the present invention is best understood by referring to FIGS. 1–6 of the drawings, like numerals being used for like and corresponding parts of the various drawings.

Figure 1:
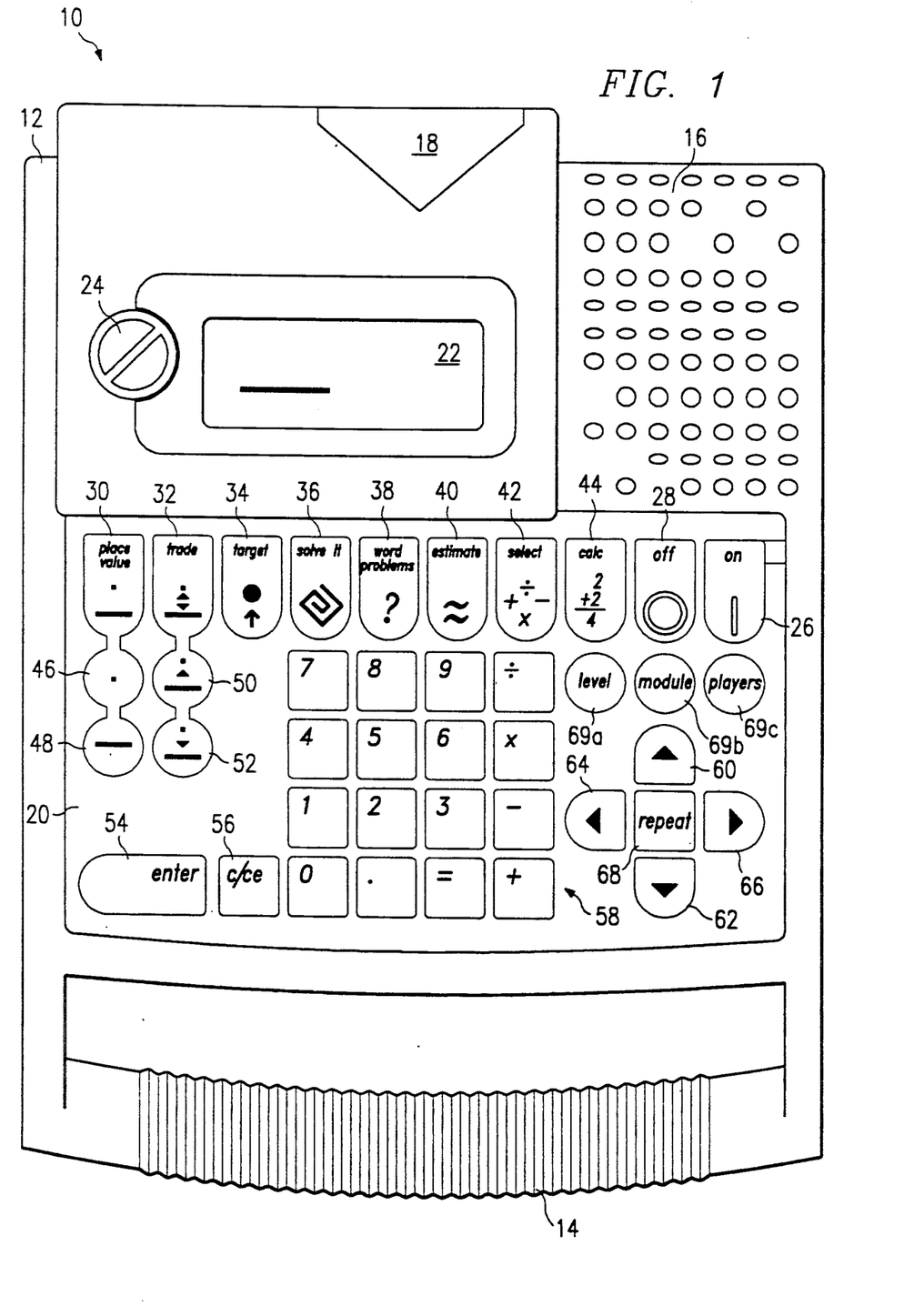
FIG. 1 illustrates a perspective view of a preferred embodiment of the present invention.

FIG. 1 illustrates a front view of the electronic teaching device of the present invention. The electronic teaching device 10 comprises an outer shell 12 including a handle 14, a speaker grill 16, memory port 18, keyboard 20, display 22, and contrast adjustment knob 24. The keyboard 20 is typically a planar keyboard comprising a plurality of switches depicted on a plastic overlay. On/Off switches 26 and 28 allow the user to turn the electronic teaching device 10 on or off, respectively. A first row of keys sets forth the different functions of the electronic device: "Place Value" 30, "Trade" 32, "Target" 34, "Solve It" 36, "Word Problems" 38, "Estimate" 40, "Select" 42, and "Calc" 44. The Place Value function key 30 includes a "ones" place value key 46 and a "tens" place value key 48. The Trade function key 32 includes a "ten to ones" trade key 50 and a "ones to ten" trade key 52. The keyboard additionally comprises an Enter key 54, a Clear/Clear Entry key 56, a calculator keypad 58 including digits "0-9", ".", "=", and the basic mathematical operators "+", "−", "×", and "÷". Additionally, up, down, left and right cursor keys 60, 62, 64 and 66 are provided along with a "Repeat" key 68. "Level", "module", and "players" keys 69a–c are also provided.

Figure 2:
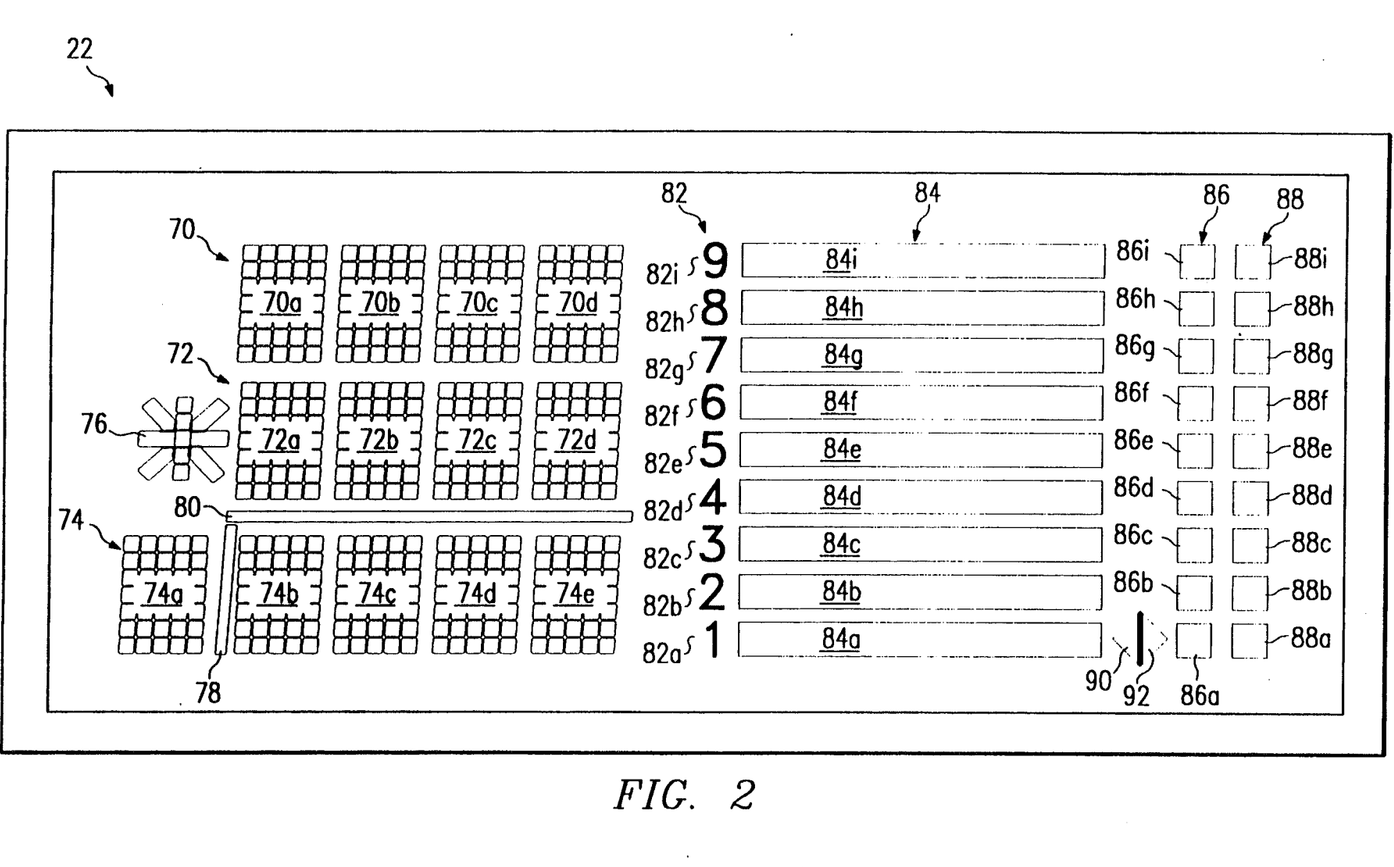
FIG. 2 illustrates a diagram of a preferred embodiment of the display used with the present invention.

The display 22 is shown in greater detail in FIG. 2. The display 22 comprises a first row 70 of arrays 70a–d, a second row 72 of arrays 72a–d and a third row 74 of arrays 74a–e. Each of the arrays 70a–d, 72a–d and 74a–e are operable to display a numerical representation of a digit along with letters and symbols. An operation array 76 is operable to display a representation of the four basic mathematical operations. Vertical bar 78 and horizontal bar 80 may be used together to form a divisor symbol or horizontal bar 80 may be used by itself as a result bar. Digits "1"–"9" may be displayed by outputs 82a–i (referred to generally as digits 82). A column of bars 84a–i (referred to generally as bars 84), representing the ten's place value are disposed to the right of digits 82. A column of unit blocks 86a–i (referred to generally as blocks 86) representing the one's place are disposed to the right of bars 84; overflow blocks 88a–i (referred to generally as overflow blocks 88) are provided next to unit blocks 86 for instances when the one's place value exceeds nine blocks because of a mathematical operation. Left and right arrows 90 and 92 are available to display a carry or borrow situation, respectively.

Figure 3:
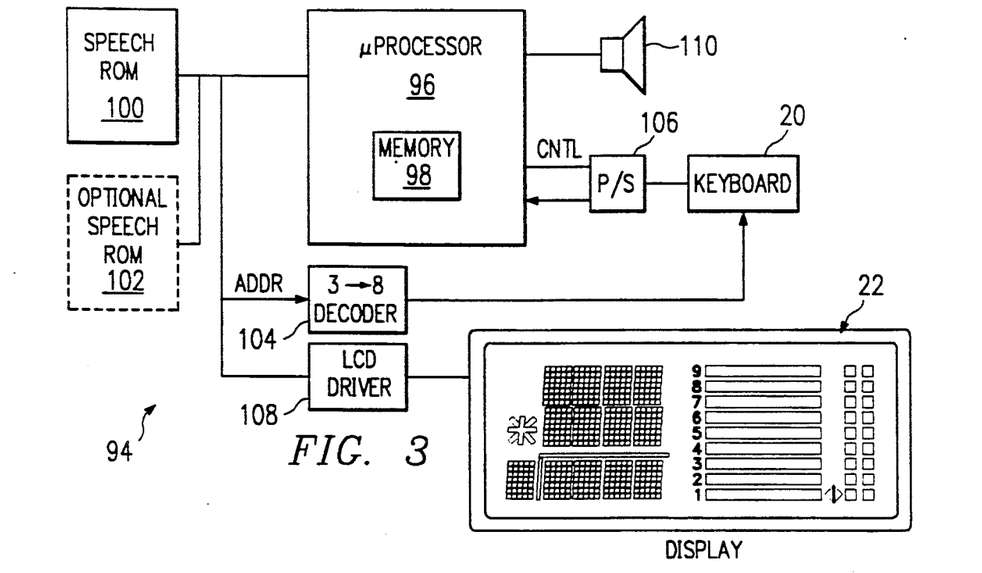
FIG. 3 illustrates a block diagram of the circuitry used in the preferred embodiment.

FIG. 3 illustrates a block diagram of the circuitry used in the preferred embodiment of the present invention. The circuit 94 includes a microprocessor 96 having a program memory 98. The microprocessor is coupled to a speech ROM 100 and an optional speech ROM 102 which hold the speech data. Further, the microprocessor is connected to the keyboard 20 through a 3-to-8 decoder 104 and through a parallel-to-serial shift register 106. The microprocessor outputs data to the display 22 through an LCD driver 108. Audio output is provided through speaker 110. In the preferred embodiment, the microprocessor 96 comprises a speech synthesizing microprocessor such as the Texas Instruments Inc. 50C10, which has an internal 8 k memory. The speech ROMs 100 and 102 may comprise a TI60C18, 32 k ROM, or equivalent. The parallel-to-serial shift register may comprise a TI74HC165 and the 3-to-8 decoder may comprise a TI74HC138.

In operation, the microprocessor executes a program stored in the internal memory 98 to provide various functions as described below. The speech ROM 100 stores the speech data for synthesized speech output. The additional speech ROM 102 may be plugged into the memory port 18 to provide additional speech capabilities. The 3-to-8 decoder is used to decode a 3-bit address such that one keyboard row may be scanned at a time to determine whether the user is pressing a key. This implementation reduces the number of lines necessary to scan the keyboard for input. The output of keyboard is translated through the parallel-to-serial shift register 106 to provide output to the microprocessor.

Referring to FIGS. 1-3, the overall operation of the electronic teaching device 10 is described. By pressing the On key 26, the computer uses speech synthesis to request the user to press one of the function keys 30–44. The basic concepts associated with each key are as follows:

| FUNCTION | CONCEPTS |
| --- | --- |
| Place Value | Teaches the place value system in representing one- and two-digit numbers. |
| Trade | Reenforces understanding of the Place Value system. |
| Target | Emphasizes logical reasoning and problem-solving. |
| Solve It | Uses the Place Value system to develop logical reasoning. |
| Word Problems | Tests the user's knowledge of basic mathematical terms and facts. |
| Estimate | Develops the ability to estimate the answers to problems. |
| Select | Helps the user recognize basic math operations. |
| Calculator | Provides the user the opportunity to make up and solve his or her own math problems. |

To select an activity, the corresponding function key 30–44 is pressed. The teaching device 10 repeats the name of the activity and the level of play and prompts the first user if the teaching device 10 is in a 2-player mode. The level of difficulty can be adjusted by pressing the Level key 69a. The one- or two-player mode may be toggled by pressing the Player key 69c. If the optional speech ROM 102 is plugged into the port 18, the user may toggle between the two ROMs by pressing the module button 69b.

Referring to FIGS. 1, 2, 4a–c and 5a–c, the Place Value function is described. To select the Place Value activity, the user presses the Place Value function key 30. Optionally, the user may use the Level and Player keys 69a and 69c to change the level of challenge or the number of players. For purposes of clarity, the Place Value activity will be discussed herein as if played by a single player.

Figure 4A:
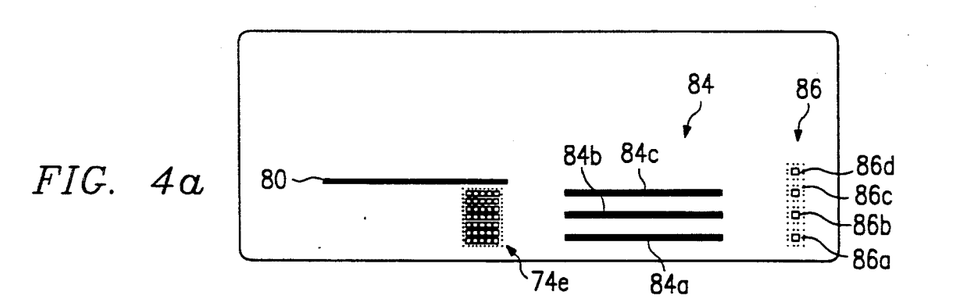
FIGS. 4a–c illustrate a function of the present invention wherein the user enters a numerical representation of the number based on a graphical representation supplied by the present invention.
Figure 4B:
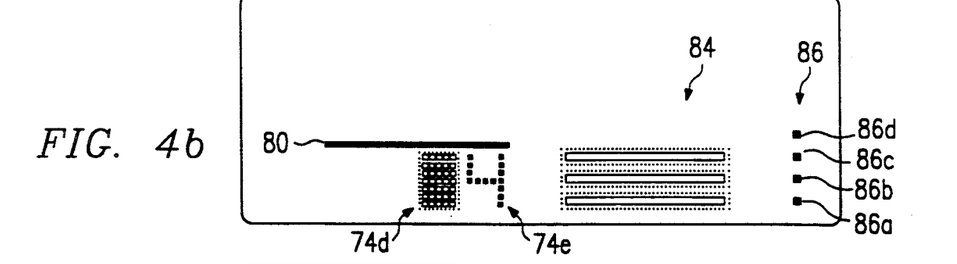

After pressing the Place Value key 30 (i level 2), the electronic teaching device asks the user, "What number is this?" and displays a number of unit blocks 86 and bars 84. Each block 86 represents a "one" and each bar 84 represents a "ten." To illustrate the relative magnitude of the bars 84 and blocks 86, the bars have approximately ten times the area as blocks 86. A flashing box 74e (flashing denoted in the FIGUREs by a dashed outline) in the one's place (on the bottom line of the display) prompts the user to enter the Number key in the calculator keypad 58 which represents the correct number of ones. Simultaneously, the unit blocks 86 are flashing. After the user has entered his or her answer for the number of unit blocks 86, the electronic teaching device 10 repeats the number of ones which has been entered. The flashing box then moves to the tens place, as shown in FIG. 4b. In FIG. 4b, the user has correctly entered the number "4" to indicate the number of unit blocks 86 displayed.

Figure 4C:
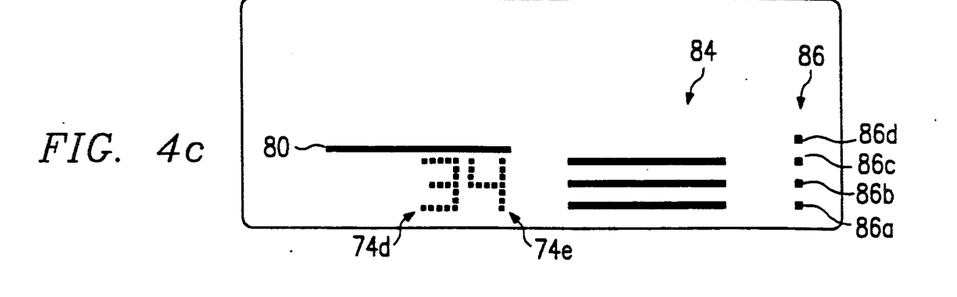

Once the number representing the unit blocks 86 has been entered, the bars 84 flash and a flashing box 74d prompts the user to enter the number of bars. Once again, the user uses the keypad 58 to enter the number representing the tens' place. As shown in FIG. 4c, the user has correctly entered "3." After pressing the Enter key, the teaching device 10 will provide a response such as "That's great" to indicate a correct answer or will respond "Sorry, try again" for an incorrect answer.

Figure 5A:
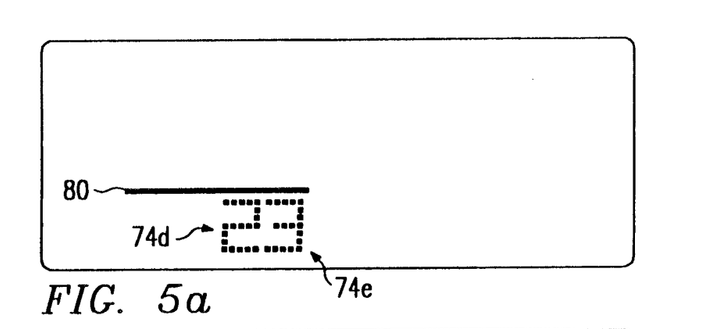
FIGS. 5a–c illustrate a function of the present invention wherein the user enters a graphical representation of a number based on numerical representation generated by the present invention.
Figure 5B:
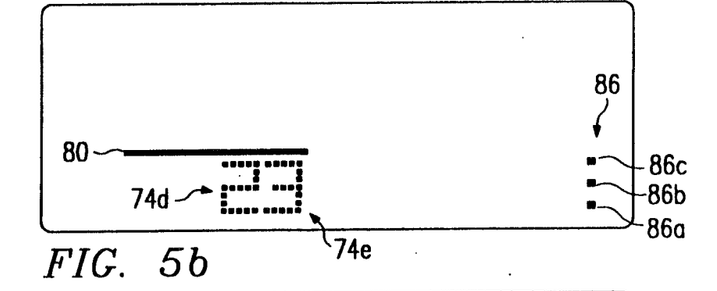
Figure 5C:
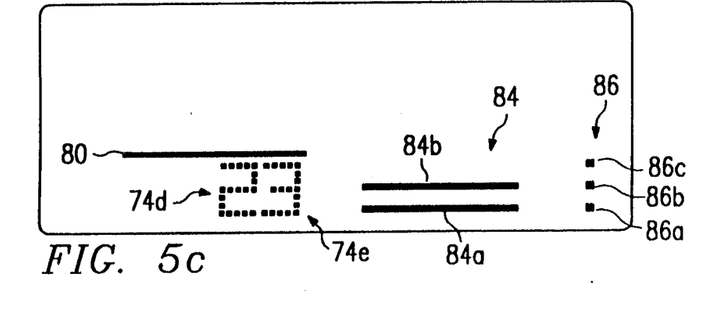

The second level of the Place Value activity is illustrated in FIGS. 5a–c. In this activity, the teaching device 10 asks "How many blocks?" and shows a number in the display, illustrated in FIG. 5a as the number "23". The user enters the number of unit blocks 86 by pressing the ones Place Value key 46 the correct number of times. As shown in FIG. 5b, the user has pressed the ones Place Value key three times. Similarly, as shown in FIG. 5c, the user presses the tens Place Value key 48 twice to represent the tens digit shown in the display block 74d. After entering the correct number of tens bars and ones blocks, the user presses the Enter key 54 and the teaching device responds positively or negatively, depending upon the correctness of the answer.

The third level of the Place Value activity asks questions from both Level 1 and Level 2.

The Trade activity is illustrated in connection with FIGS. 6a–c and 7a–c. The Trade activity has three levels of challenge and can be played by one or two players. The object is to regroup the ones-blocks 86 and 88 and tens-bars 84 to reflect the answer. The user is permitted two tries to answer correctly.

The first level of the Trade activity teaches addition and the second level of the Trade activity teaches substraction. The third level is combination of addition and substraction.

Figure 6A:
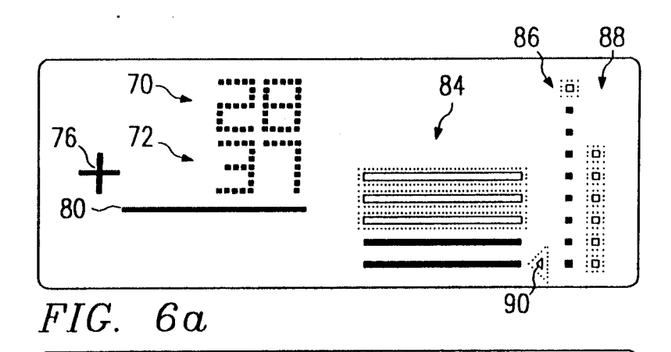
FIGS. 6a–c illustrate use of a graphical representation of numbers to demonstrate addition.
Figure 6B:
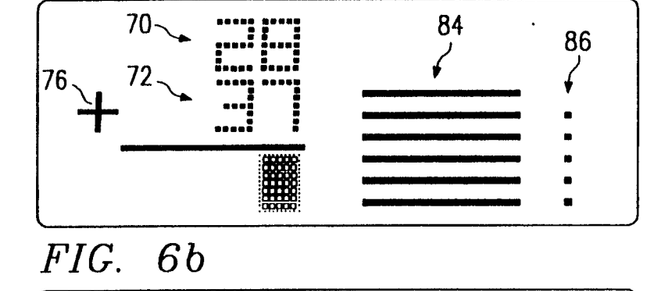
Figure 6C:
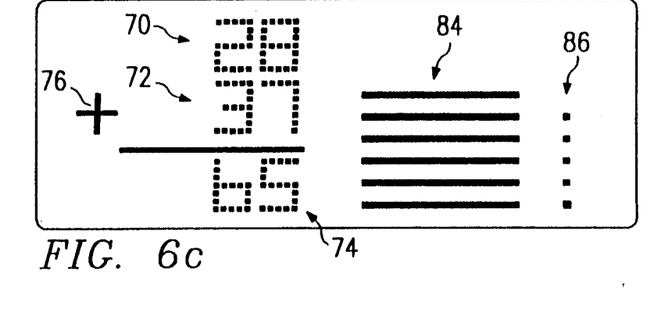

FIGS. 6a–c illustrate the first level of the Trade activity. After pressing the Trade function key 32, the teaching device 10 asks the user to "Make the Trade," and an addition problem appears in the display, such as the one illustrated in FIG. 6a. In this FIGURE, the addition problem of "28+37" is displayed along with the number of blocks corresponding to addition of each place value. Hence, fifteen unit and overflow blocks 86 and 88 are shown along with five bars 84. The group of unit and overflow blocks 86 and 88 and bars 84 that represent the number on the second line of the display, i.e., seven unit blocks 88 and three bars 84, flash. The non-flashing blocks 86 and bars 84 represent the number on the first line of the display. The arrow 90 is flashing to point in the direction which the trade should be made. To trade ones for a ten, the ones to ten Trade key 52 is pressed. To trade a ten for ones, the ten to ones Trade key 50 is pressed. When a Trade key 50 or 52 is pressed, the blocks in the display change to reflect the trade.

After the trade is made, as shown in FIG. 6b, the blocks stop flashing. These blocks represent the answer. The user is then prompted by the flashing boxes 74d–e to enter the number of ones and then the number of tens by using the keypad 58. As shown in FIG. 6c, the user has correctly entered "65" as the answer. The teaching device 10 then indicates the correctness of the answer by a positive or a negative response.

Figures 7A, 7B, 7C:
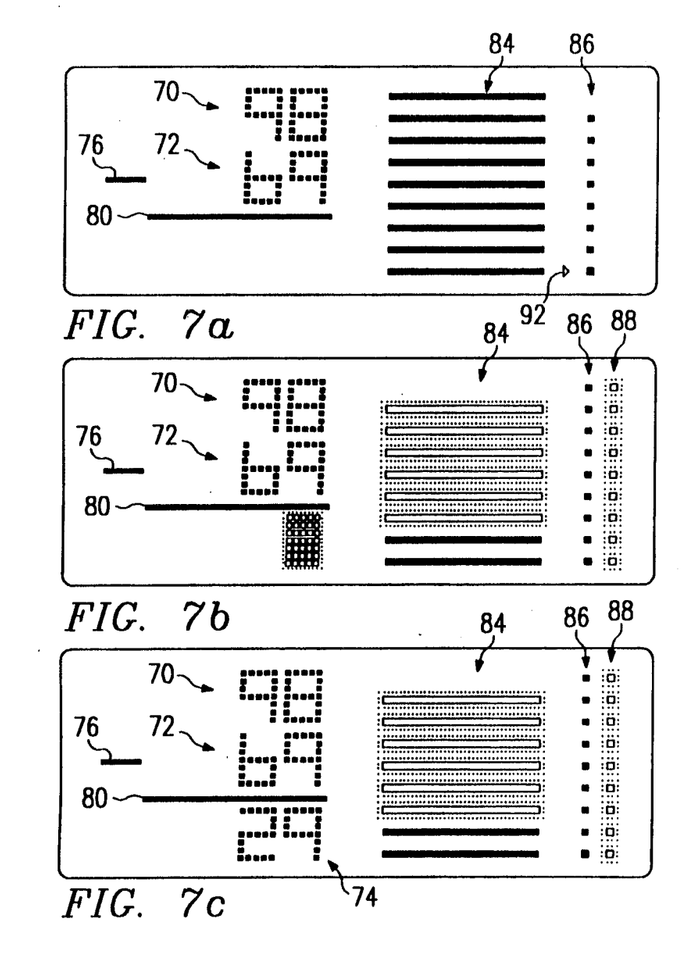
FIGS. 7a–c illustrate use of the graphical representation of numbers to demonstrate subtraction.

The second level of the Trade activity is illustrated in connection with FIGS. 7a–c. Once again, an equation, shown in FIG. 7a as 98–69, is displayed along with a number of bars and blocks which represent the minuend. The number ones in the place of the minuend will be less than the number in the ones' place of the subtrahend. Hence, a borrow must be performed to trade a ten for ones, the ten to ones Trade key 50 is pressed and ten unit blocks 86 and 88 are added to the display and one bar 84 is removed. The number of bars 84 representing the value of the tens' place of the subtrahend flash along with the number of blocks 86 and 88 representing the value of the ones' place of the subtrahend. Hence, the non-flashing bars 84 and blocks 86 represent the answer, as shown in FIG. 7b. In FIG. 7c, the user enters the answer using the keypad 58 and the Enter key 54. Once again, the teaching device responds to the correctness of the answer.

A third level of the Trade activity is a combination of addition and subtraction problems.

FIGS. 8a–e illustrate the Target activity. In this activity, one player can play against the teaching device 10, or two players can play against each other. The object is to be the first to arrive at a target number selected by the teaching device 10.

Figure 8A:
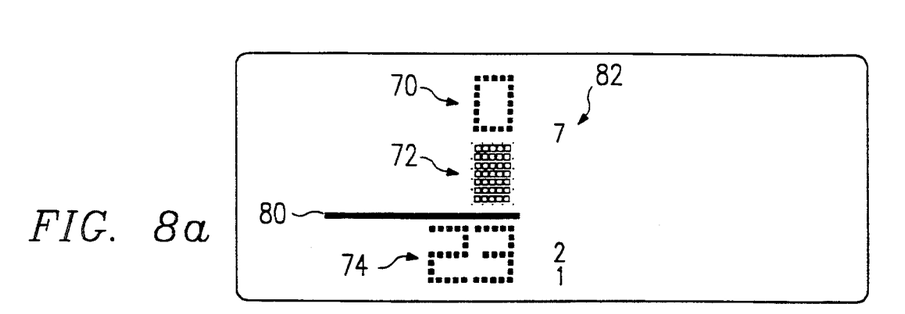
FIGS. 8a–e illustrate the "Target" function of the present invention.
Figure 8B:
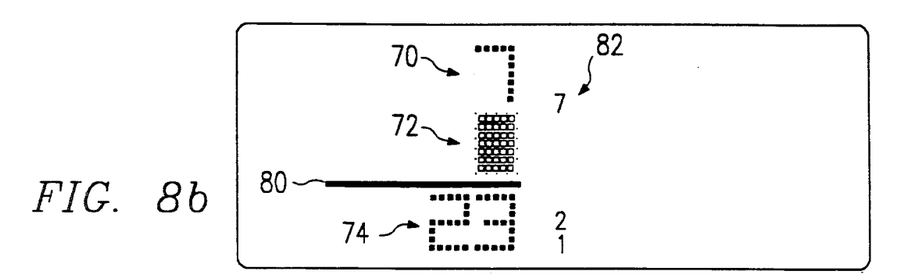
Figure 8C:
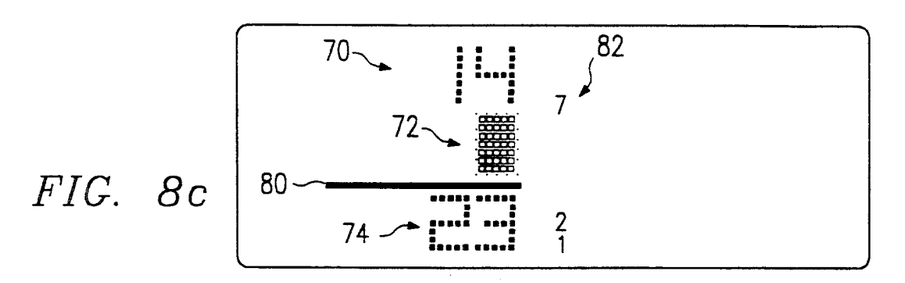
Figure 8D:
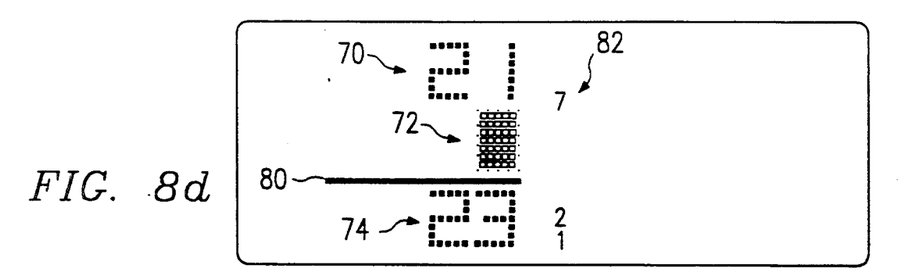
Figure 8E:
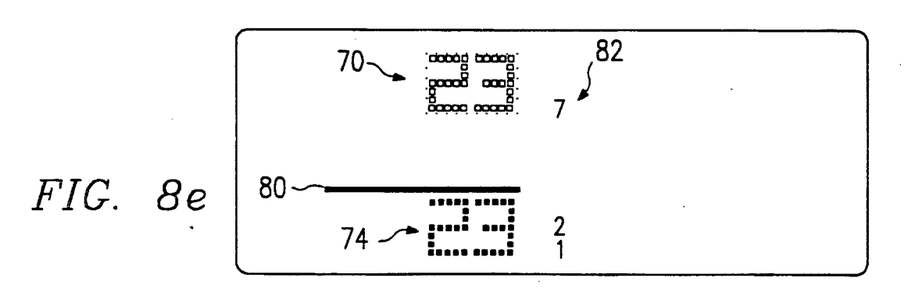

After selecting the Target activity by pressing the Target function button 34, the teaching device responds by choosing a target number and three other numbers players can use to reach the target. For example, in the FIG. 8a, the teaching device 10 has chosen a target of "23" and provided numbers "1, 2 and 7" (as displayed by digits 82) for the players to use to reach the target. Initially, the accumulated sum is set to zero. In FIG. 8b, the first player chooses a "7". In FIG. 8c, the second player chooses a "7" as well, rendering an accumulated sum of "14." In FIG. 8d, the first player chooses a "7" for an accumulated sum of "21." In FIG. 8e, the second player chooses a "2" to hit the target value of "23." The numbers are entered by the users on the keypad 58. If the target is exceeded by a player, the opponent player wins. If the activity is in the one player mode, the teaching device 10 selects numbers for the second player. After the target is reached or exceeded, the teaching device announces the winner.

This activity challenges the user to think ahead to determine the possible combinations of numbers which may be used to reach the target.

FIGS. 9a–h illustrate the Solve It activity. This activity is three levels of challenge and can be played by one or two players. The object is to arrange the displayed numbers to get the largest or smallest sum, difference, quotient or product. Generally, it is requested that the result be positive.

Figure 9A:
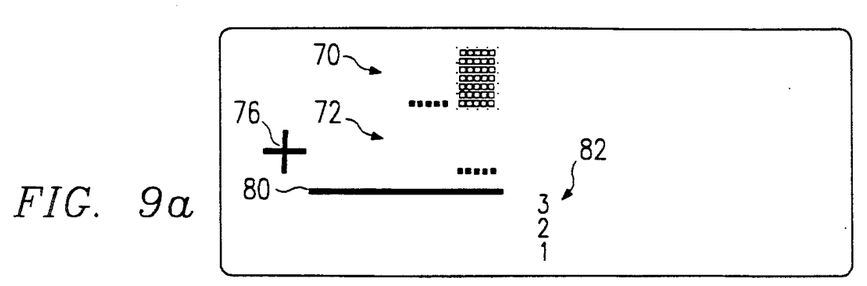
FIGS. 9a–h illustrate the "Solve-it" function of the present invention.
Figure 9B:
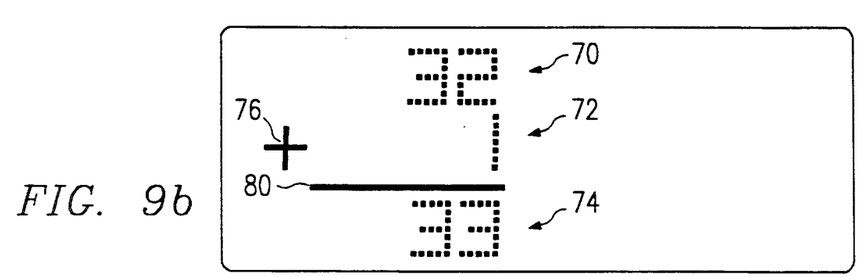

In FIGS. 9a–b, the teaching device has selected number "1, 2 and 3" (as displayed by digits 82) to be arranged in an addition problem by the user to derive the largest sum. The user positions the available numbers using the keypad 58 and the arrow keys 60–66 to arrange the numbers as shown in FIG. 9b. The number of digits appearing in the problem depends upon the level of play.

Once the numbers are entered, the Enter key 54 is pressed. The teaching device 10 responds positively or negatively, depending upon the correctness of the answer. After two incorrect tries, the teaching device 10 displays the equation and answer and then repeats them orally.

Figure 9C:
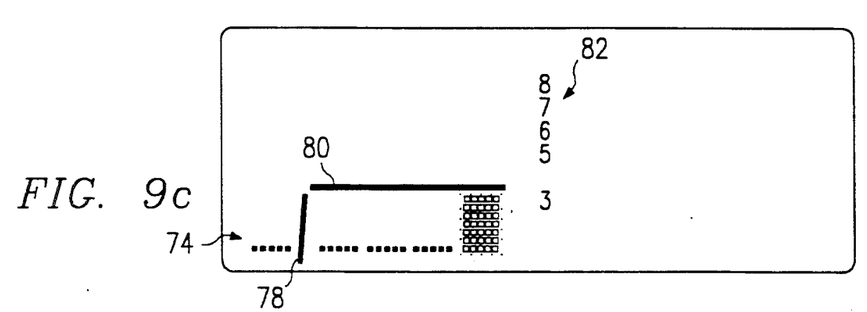
Figure 9D:
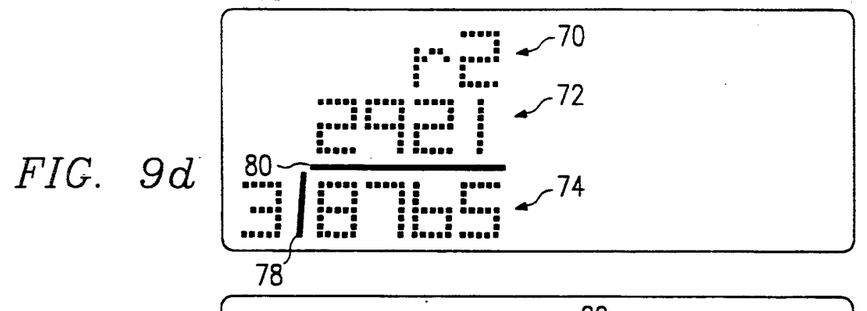

FIGS. 9c and d illustrate the Solve It activity using division. In this case, a division sign is produced by vertical line 78 and horizontal line 80 by the teaching device and five underlines are provided by arrays 74a–e to indicate placement of the available numbers, illustrated in FIG. 9c as "3, 5, 6, 7 and 8." In this example, the teaching device has requested that the largest positive quotient be determined. In FIG. 9d, the user has properly arranged the numbers as "8765" divided by "3." After the user presses the Enter key, the quotient of "2921" with a remainder of "2" is displayed by the teaching device 10 and is orally repeated.

Figure 9E:
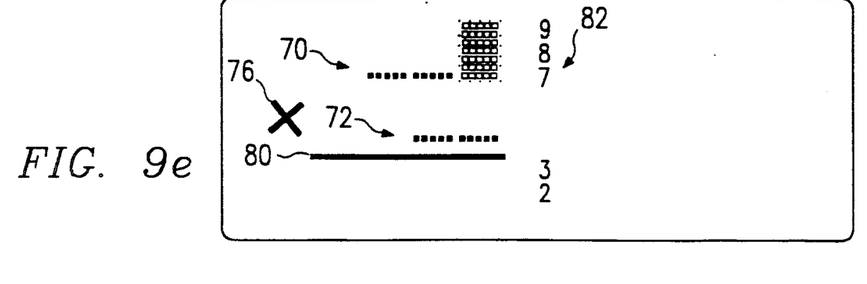
Figure 9F:
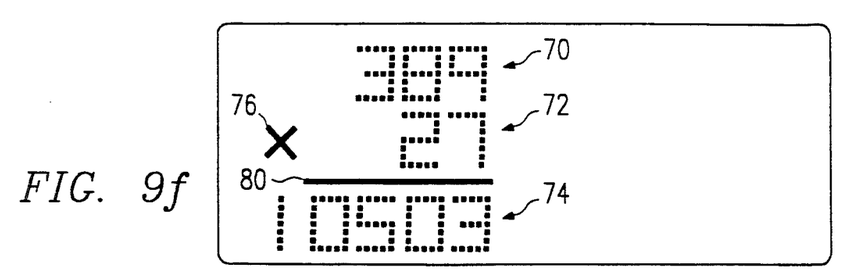

In FIGS. 9e and f, a multiplication problem is illustrated for the Solve It activity. In this example, the teaching device 10 has chosen the numbers "2, 3, 7, 8 and 9" and a multiplication sign is provided. In this example, the teaching device requests that the user find the smallest positive solution. In FIG. 9f, the user has properly arranged the numbers as "389" times "27." After pressing the Enter key, the teaching device 10 displays the correct answer, "10503."

Figure 9G:
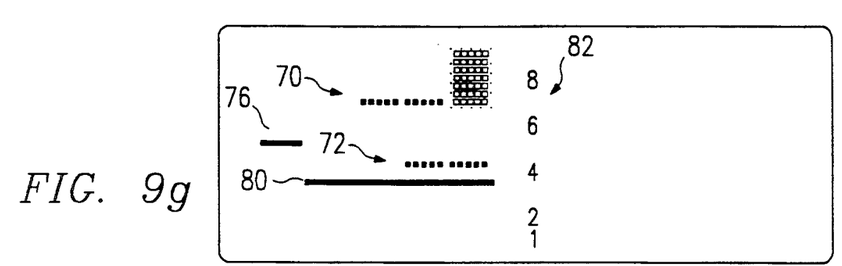
Figure 9H:
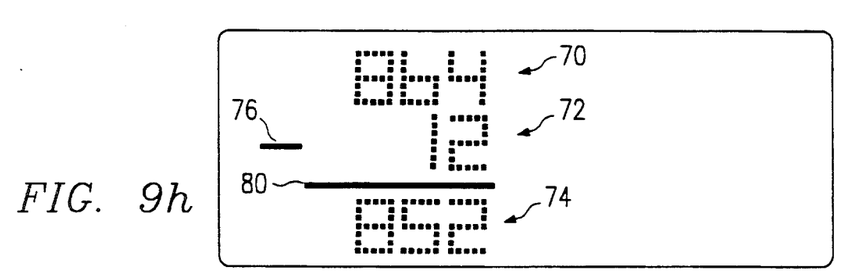

FIGS. 9g and h illustrate a subtraction problem using the Solve It activity. In this case, the teaching device 10 has chosen the numbers "1, 2, 4, 6 and 8" and requested the largest positive solution. In FIG. 9h, the user has properly arranged the numbers as "864" minus "12." After pressing the Enter key, the teaching device displays and repeats the answer "852."

The Word Problem activity has three levels of challenge. It can be played by one or two players. The object is to listen to the word problems and type in the numerical answer. The Word Problem activity is selected by pressing the Word Problem function key 38. The teaching device 10 states a question such as "I am a prime number between 70 and 80. The sum of my digits is 10. What am I?". The correct answer is "73", which may be entered by the user using the keypad 58. Another question might be "What is next? 5,7,11,19 . . . ". The correct answer is "35" (the difference between sequential numbers in the sequence doubles with each additional number). During the Word Problem activity, the calculator may be used to determine the answers to the problems. After a round of five problems, the score is announced. Additional word problems may be provided by the optional ROM 102.

Figure 10A:
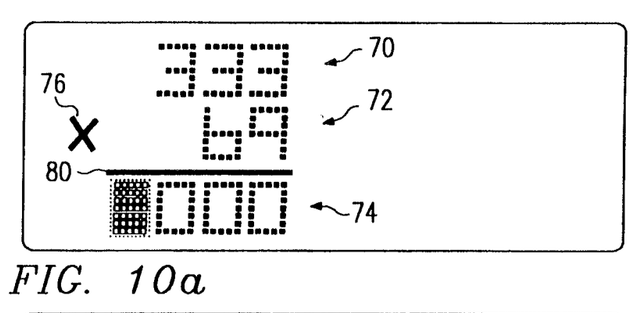
FIGS. 10a–c illustrate the "Estimate" function of the present invention.
Figure 10B:
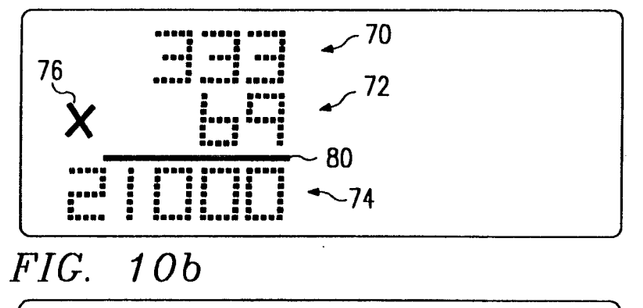
Figure 10C:
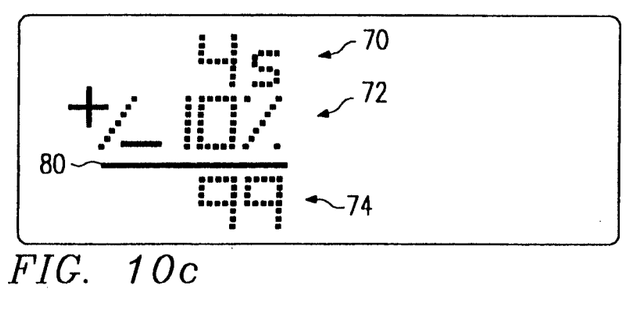

The Estimate activity has three levels of challenge. The object is to estimate, as closely as possible, the answer to a problem in as little time as possible. FIGS. 10a-c illustrate a multiplication problem. In FIG. 10a, the teaching device 10 provides the equation "333×69=__000." Zeros that appear on the third line of the display represent digits which the user does not have to estimate. The user keys in his estimate using the keypad 58. As shown in FIG. 10b, the user has estimated the answer to equal "21,000" by pressing "21" on the keypad 58 and pressing the Enter key 54. In FIG. 10c, the teaching device 10 produces a score based on how fast and close the answer is to the correct answer. As illustrated, the user has answered the question within four seconds with an accuracy of ±10% for a score of "99". The Estimate activity also provides subtraction, addition and division problems. For example, the teaching device 10 may provide an equation of "366+962=__00." An example of a division equation would be "5568÷7=__00." An example of subtraction equation would be "666−105=__0."

Figure 11A:
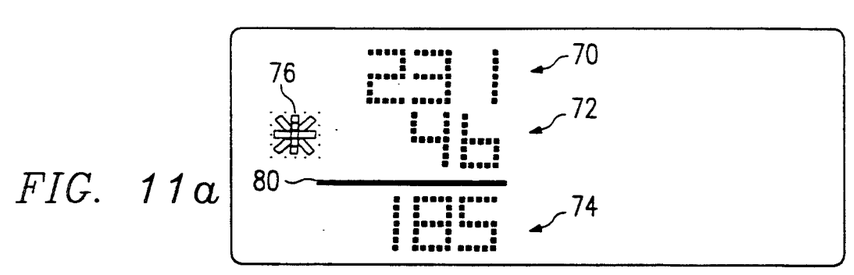
FIGS. 11a–b illustrate the "Select" function of the present invention.
Figure 11B:
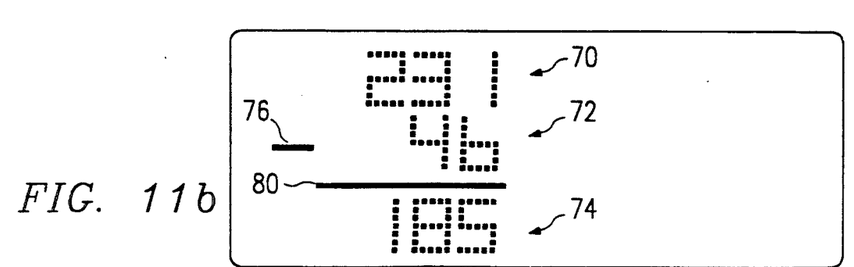

FIGS. 11a-b illustrate the Select activity. This activity has three levels of challenge and can be played by one or two players. The object is to select the correct operation (+, −, ×, or ÷ sign) for a problem that is displayed with its answer. When this activity is selected by pressing the Select function key 42, the teaching device 10 asks the user to "choose the operation" and displays a problem with the operators flashing one after another. As shown in FIG. 11a, the equation "231__46=185" is displayed. The user chooses an operation key (−, +, × or ÷ sign) from the keypad 58 and presses the Enter key 54, or presses the Enter key 54 as the particular operator is displayed. In the example of FIG. 11a, the minus sign is the correct answer. After each player completes a round of five problems, the score for each player is announced. This scoring feature is also used for the Place Value, Trade, Solve It, and Word Problem functions.

The Calculator activity is selected by pressing the Calculator function key 44. In this mode of operation, the keypad 58 acts as a four-function calculator. The user may select a problem such as "89×56" and determine the answer without the aid of the teaching device 10. After the answer is determined, the equal sign may be pressed to compare the user's answer with the correct answer.

The teaching device of the present invention provides several advantages over the prior art. The Place Value and Trade activities provide a pictorial representation of both numbers and of the addition and subtraction operations, enhancing the user's understanding of the number system. Further, the Target, Solve It, Word Problems, Estimate and Select activities challenge the user into approaching mathematical operations from different perspectives to enhance his or her learning. Further, activities may be played as a contest between two players, increasing the challenge to learn. The different levels of difficulty allow the teaching device to be used over a long time period.

Although the present invention has been described in detail, it should be understood that various changes, substitutions and alterations can be made herein without departing from the spirit and scope of the invention as defined by the appended claims.

What is claimed is:

1. An electronic apparatus for teaching mathematics comprising:

memory means having digital data stored therein from which a plurality of mathematical problems may be derived for presentation to a user of the apparatus for solution, wherein at least some of the mathematical problems comprise respective sets of a plurality of numbers which the user is expected to arrange in an equation with a mathematical operator taken from the group including addition, subtraction, multiplication and division to achieve one of the lowest and highest positive results as the solution to the respective mathematical problem;

means operably associated with said memory means for selecting a mathematical operator and a plurality of numbers as a set corresponding to digital data as stored in said memory means to derive a particular mathematical problem;

presentation means operably associated with said selection means and including display means for visually presenting the selected set of numbers and the mathematical operator providing the particular mathematical problem;

user input means for receiving inputs from the user indicative of an effort leading to a proposed solution of the mathematical problem;

comparator means coupled to said selection means and to said user input means for determining the appropriateness of the inputs received by said user input means from the user with respect to a solution of the mathematical problem; and means coupled to said comparator means for producing an indication of the accuracy of the input from the user as received by said user input means in relation to the correct solution to the corresponding mathematical problem;

said display means including:

a plurality of number display arrays arranged in a plurality of rows, each of said number display arrays being operable to display a representation of an individual digit from "0" to "9", at least one mathematical operation display array operable to display a symbolic representation of one of the arithmetical operations of addition, subtraction, multiplication and division as a mathematical operator, a horizontally extending result bar disposed between at least two rows of number display arrays and a further row of number display arrays, and a dedicated display area for presenting a plurality of display positions arranged in a line for visually displaying respective sets of numbers in at least some of the display positions of the dedicated display area for arrangement by the user in an equation to achieve one of the lowest and highest positive results as a solution to the posed mathematical problem.

2. An electronic apparatus for teaching mathematics as set forth in claim 1, wherein the solution to the respective mathematical problems involving respective sets of a plurality of numbers and a mathematical operator as selected by said selection means from said memory means involves the arrangement of the plurality of numbers included in the selected set in an equation with the selected mathematical operator to achieve the lowest positive result.

3. An electronic apparatus for teaching mathematics as set forth in claim 1, wherein the solution to the respective mathematical problems involving respective sets of a plurality of numbers and a mathematical operator as selected by said selection means from said memory means involves the arrangement of the plurality of numbers included in the selected set in an equation with the selected mathematical operator to achieve the highest positive result.

4. An electronic apparatus for teaching mathematics as set forth in claim 1, wherein said presentation means further includes speech synthesizer means coupled to said selection means and to said memory means for generating analog signals representative of human speech, and audio means coupled to said speech synthesizer means for converting said analog signals into audible human speech for audibly announcing the nature of the selected mathematical problem to the user as a request for the solution to the mathematical problem.

5. An electronic apparatus for teaching mathematics as set forth in claim 4, wherein said accuracy indicating means comprises means for causing said speech synthesizer means and said audio means coupled thereto to present an audible announcement in a human language of the results of the comparison between the inputs from the user as received by said user input means and the correct solution to the mathematical problem.

6. An electronic apparatus for teaching mathematics as set forth in claim 1, wherein said dedicated display area including said plurality of display positions is arranged as an elongated vertical display area adjacent to the plurality of rows of said plurality of number display arrays.

7. An electronic apparatus for teaching mathematics as set forth in claim 1, wherein each of the respective sets of numbers as visually displayed by said dedicated display area in response to the selection of a particular set of a plurality of numbers by said selection means includes a plurality of digits for display in display positions numbering less than the total number of display positions of said dedicated display area.

8. An electronic apparatus for teaching mathematics comprising:

memory means having digital data stored therein from which a plurality of mathematical problems may be derived for presentation to a user of the apparatus for solution, wherein at least some of the mathematical problems comprise respective sets of a plurality of numbers and a target number with the user being expected to arrange the plurality of numbers included in a set in an equation with a mathematical operator taken from the group including addition, subtraction, multiplication and division to achieve a result corresponding to the target number as the solution to the respective mathematical problem;

means operably associated with said memory means for selecting a target number and a plurality of numbers as a set corresponding to digital data as stored in said memory means to derive a particular mathematical problem;

presentation means operably associated with said selection means and including display means for visually presenting the selected set of numbers and the target number providing the particular mathematical problem;

user input means for receiving inputs from the user indicative of an effort leading to a proposed solution of the mathematical problem; and comparator means coupled to said selection means and to said user input means for determining the appropriateness of the inputs received by said user input means from the user with respect to a solution of the mathematical problem; and means coupled to said comparator means for producing an indication of the accuracy of the input from the user as received by said user input means in relation to the correct solution to the corresponding mathematical problem;

said display means including:

a plurality of number display arrays arranged in a plurality of rows, each of said number display arrays being operable to display a representation of an individual digit from "0" to "9", at least one of said number display arrays being operable to display the target number as selected by said selection means, a horizontally extending result bar disposed between said at least one number display array adapted to display the target number and the further rows of number display arrays, and a dedicated display area for presenting a plurality of display positions arranged in a line for visually displaying respective sets of numbers in at least some of the display positions of the dedicated display area to be employed by the user in achieving a mathematical result equal to the target number as a solution to the posed mathematical problem.

9. An electronic apparatus for teaching mathematics as set forth in claim 8, wherein the mathematical operator is addition, and means operably associated with said user input means for maintaining a running total on at least one row of number display arrays of said display means of the respective numbers of said set of numbers provided by said user input means as inputs from the user chosen in an effort to achieve a cumulative sum equal to the target number.

10. An electronic apparatus for teaching mathematics as set forth in claim 9, wherein said presentation means further includes speech synthesizer means coupled to said selection means and to said memory means for generating analog signals representative of human speech, and audio means coupled to said speech synthesizer means for converting said analog signals into audible human speech for audibly announcing the nature of the selected mathematical problem to the user and declaring the user as a contest winner in relation to the electronic apparatus if the last input received by said user input means from the user results in a running total equal to the target number.

11. An electronic apparatus for teaching mathematics as set forth in claim 8, wherein said dedicated display area including said plurality of display positions is arranged as an elongated vertical display area adjacent to the plurality of rows of said plurality of number display arrays.

12. An electronic apparatus for teaching mathematics as set forth in claim 8, wherein each of the respective sets of numbers as visually displayed by said dedicated display area in response to the selection of a particular set of a plurality of numbers by said selection means includes a plurality of digits for display in display positions numbering less than the total number of display positions of said dedicated display area.

* * * * *